US005974082A

United States Patent [19]

Ishikawa et al.

[11] Patent Number: 5,974,082

[45] Date of Patent: Oct. 26, 1999

[54] SPREAD SPECTRUM COMMUNICATIONS SYSTEM

[75] Inventors: Hiroyasu Ishikawa; Hideyuki Shinonaga, both of Saitama; Hideo Kobayashi, Tokyo, all of Japan

[73] Assignee: Kokusai Denshin Denwa Co., Ltd., Tokyo, Japan

[21] Appl. No.: 08/958,094

[22] Filed: Oct. 27, 1997

[30] Foreign Application Priority Data

Oct. 28, 1996 [JP] Japan .................................... 8-300796

[51] Int. Cl.[6] ........................................ H04K 1/00

[52] U.S. Cl. ........................................ 375/206

[58] Field of Search .................................... 375/206, 208, 375/200, 260; 370/441, 329, 343; 455/500, 509, 524

[56] References Cited

U.S. PATENT DOCUMENTS

| | | | |
|---|---|---|---|
| 5,063,560 | 11/1991 | Yerbury et al. | 375/206 |
| 5,241,562 | 8/1993 | Partyka et al. | 375/206 |
| 5,319,672 | 6/1994 | Sumiya et al. | 375/200 |

*Primary Examiner*—Tesfaldet Bocure

*Attorney, Agent, or Firm*—Nikaido, Marmelstein, Murray & Oram LLP

[57] ABSTRACT

A spread spectrum communications system includes at least one communication station for transmitting a plurality of digital information data sequences via a plurality of communication channels by using the same PN code sequence. The communication station spreads the respective digital information data sequences by the PN code sequence to provide spread spectrum signals, modulates the spread spectrum signals by respective carriers having different frequencies from each other to provide modulated signals, and then transmits the modulated signals via the communication channels respectively. A frequency interval of the carrier frequencies is determined to an even-numbered multiple of a symbol rate of the transmitted digital information data sequences.

14 Claims, 9 Drawing Sheets

INFORMATION DATA SEQUENCE
MODULATOR
PN CODE GENERATOR
MODULATOR
LOCAL OSCILLATOR
BANDPASS FILTER
f1
f2
fj
fn-1
fn
7
|fj −fk| =N×2R
N:INTEGER
R:SYMBOL RATE OF TRANSMITTING INFOMATIO

SPREAD SPECTRUM COMMUNICATIONS SYSTEM

FIELD OF THE INVENTION

The present invention relates to a Direct Sequence-Spread Spectrum (DS-SS) communication system used for any radio communications such as fixed satellite communications, mobile satellite communications, land mobile communications, wireless Local Area Network (LAN) communications and private wireless communications, and for any wire communications transmitting information by means of wires such as optical fiber cables and coaxial cables.

DESCRIPTION OF THE RELATED ART

One application of DS-SS is Code Division Multiple Access (CDMA) technic, which is considered to be a candidate multiple access method for future telecommunication systems. In conventional CDMA systems, different kinds of Pseudo-random Noise (PN) codes and the same carrier frequency are assigned to each communication station. Since all stations use the same frequency band, each station shall be distinguished with the assigned PN code by using the property that the cross correlation among PN codes is very low.

In practice, according to the conventional CDMA communication systems, information signals are spectrum spread by different PN codes first, and then the spread spectrum signals modulate carriers having the same frequency $f_a$ at respective transmitting stations. Thus modulated signals are transmitted from respective transmitting stations to receiving stations after filtered by respective band pass filters. At one of the receiving stations, the transmitted signals are frequency-converted by a local oscillation, and then despread by the same PN code used for spectrum spreading of desired information. Since PN code indicates strong correlation only with the signal spread by the same PN code, the desired information data can be selectively obtained among the various received signals.

As shown in FIG. 1, according to the conventional CDMA communication system, spectrums of received signal from j or k transmitting stations (j and k are the number of transmitting stations communicating simultaneously) completely overlap each other because their center (carrier) frequencies coincide at the frequency $f_a$ or $f_b$.

Generally, as for PN codes for signal spectrums spreading in the DS-SS communication system, maximum length sequences are utilized. The number of existing maximum length sequences is small when the code length thereof is short, for example, the number is only 18 when the code length thereof is 127 bits, 16 when 255 bits, and 48 when 511 bits. Therefore, in order to accommodate more stations simultaneously in the CDMA communication system in which each of the transmitting stations is distinguished only with the assigned PN code, maximum length sequences with extremely longer code length, in other words maximum length sequences having greater number of independent sequences would be required. The longer code length of the PN code sequences, the more complicating PN code generation process, construction of correlators, and also demodulation process.

In the CDMA system, the same PN code cannot be used at the same carrier frequency. Thus, according to the conventional CDMA system, in case that more transmitting stations than the number of the existing PN codes are required in the system, a plurality of frequency bands should be employed to reuse the PN code as shown in FIG. 1. In this figure, one set of 1 to j stations with the carrier frequency $f_a$ and the other set of 1 to k stations with the carrier frequency $f_b$ are illustrated. However, this configuration requires m times of frequency band width in order to accommodate m times of the transmitting stations simultaneously, namely to reuse the same PN code for m times.

Furthermore, in case that PN codes are not assigned permanently to the respective stations but assigned corresponding to the demands for communication, it is necessary that each station has a correlator device which can recognize all the PN code sequences used therein. This results in too many matched filters whose code patterns are physically fixed such as surface acoustic wave (SAW) filters, or the device which has the programmable functions. A digital logic LSI which can respond to various PN code sequences may be used. However, in case of using the PN codes with very long code length, information bit rate or operation speed thereof will be limited due to the heating or power consumption problems.

In order to solve the aforementioned problems, a spread spectrum communications system for multiple access using only the same PN code commonly assigned to all stations simultaneously (CFO-SSMA system, Carrier Frequency Offset—Spread Spectrum Multiple Access system) has been proposed (Sumiya et al. U.S. Pat. No. 5,319,672).

In this known CFO-SSMA communication system, a plurality of transmitting stations use the same PN code for spectrum spreading respective digital information and use carriers having slightly different frequencies from each other as shown in FIG. 2, so that spectrums of at least two of the modulated signals overlap each other. The frequency difference between adjacent carriers is selected to an integer multiple of a symbol rate of the transmitting information. Thus, an adjacent signal will never interfere with the demodulation of a desired signal. Accordingly, a multiple access in the spread spectrum communication is available by using a single PN code only, without requiring as many PN codes as the simultaneous transmitting stations.

However, this CFO-SSMA communication system cannot achieve any interference-less communication when chip timings of Direct Sequence (DS)-spread spectrum signals simultaneously transmitted from the transmitting stations are not completely coincide each other at the receiving side. Namely, when the received DS-spread spectrum signals from the transmitting stations are not completely synchronized with each other at the receiving side, the signals from the transmitting stations cause intersymbol interference and deteriorate the transmission quality of the communication links. In general, each of the transmitting stations will have an independent oscillator, it will be impossible to receive, at the receiving side, DS-spread spectrum signals from these transmitting stations under the condition where the chip timings are completely synchronized. Thus, the CFO-SSMA communication system has to accept a certain offset of chip timings of the DS-spread spectrum signals from the transmitting stations and accordingly to allow deterioration of transmission quality of the communication links.

The above-mentioned problems may occur not only when a plurality of transmitting stations adopting the CFO-SSMA method simultaneously send DS-spread spectrum signals but also when a single transmitting station adopting the CFO-SSMA method simultaneously send DS-spread spectrum signals through a plurality of communication channels.

SUMMARY OF THE INVENTION

It is therefore an object of the present invention to provide a spread spectrum communications system whereby deterioration of transmission quality due to possible offset of chip timings of DS-spread spectrum signals from a plurality of transmitting ends (single transmitting station with a plurality of channels, or a plurality of transmitting stations) can be prevented.

According to the present invention, a spread spectrum communications system including at least one communication station for transmitting a plurality of digital information data sequences via a plurality of communication channels by using the same PN code sequence. The above-mentioned at least one communication station spreads the respective digital information data sequences by the PN code sequence to provide spread spectrum signals, modulates the spread spectrum signals by respective carriers having different frequencies from each other to provide modulated signals, and then transmits the modulated signals via the communication channels respectively. Alternately, the at least one communication station modulates the respective digital information data sequences by respective carriers having different frequencies from each other to provide modulated signals, spreads the modulated signal by the PN code sequence to provide spread spectrum signals, and then transmits the spread spectrum signals via the communication channels respectively. Particularly, according to the present invention, a frequency interval of the carrier frequencies of the channels is determined to an even-numbered multiple of a symbol rate of the transmitted digital information data sequences.

Also, according to the present invention, a spread spectrum communications system includes a plurality of transmitting ends, and at least one receiving end. Each of the transmitting ends spreads a digital information data sequence by a PN code sequence to provide a baseband spread spectrum signal, modulates the baseband spread spectrum signal by a carrier to provide a modulated signal, and then transmits the modulated signal to the receiving station. Alternately, each of the transmitting stations modulates a digital information data sequence by a carrier to provide a modulated signal, spreads the modulated signal by a PN code sequence to provide a spread spectrum signal, and then transmits the spread spectrum signal to the receiving station. The receiving station receives signals transmitted from the transmitting stations to provide a received signal, extracts a signal having a center frequency which corresponds to the carrier frequency of the desired channel, and demodulates to detect the digital information data sequence transmitted from the desired transmitting station, by using the PN code sequence. The transmitting stations use the same PN code sequence commonly assigned to all users for spectrum spreading the respective digital information data sequence and use carriers having different frequencies from each other. According to the present invention, particularly, a frequency interval of the carrier frequencies is determined to an even-numbered multiple of a symbol rate of the transmitted digital information data sequence.

Since the present invention determines a frequency interval of the carrier frequencies to an even-numbered multiple of a symbol rate of the transmitted digital information data sequence, intersymbol interference between channels due to chip timing offset of DS-spread spectrum signals from a plurality of transmitting stations can be minimized. As a result, transmission quality of the communication links can be maintained without deterioration, and also a limited frequency band which will be assigned to the communication system can be effectively utilized. In addition, a simple and cheap communication device without using complicated control protocol and a precision clock for achieving accurate synchronization can be provided.

According to the present invention, furthermore, a spread spectrum communications system includes at least one communication station in a first area for transmitting a plurality of digital information data sequences via a plurality of communication channels by using the same PN code sequence, and at least one communication station in a second area adjacent to the first area for transmitting a plurality of digital information data sequences via a plurality of communication channels by using the same PN code sequence. The communication stations spreads the respective digital information data sequences by the PN code sequence to provide spread spectrum signals, modulates the spread spectrum signals by respective carriers having different frequencies from each other to provide modulated signals, and then transmits the modulated signals via the communication channels respectively. Alternately, the communication stations modulates the respective digital information data sequences by respective carriers having different frequencies from each other to provide modulated signals, spreads the modulated signals by the PN code sequence to provide spread spectrum signals, and then transmits the spread spectrum signals via the communication channels respectively. Particularly, the carrier frequencies used in the at least one communication station in the first area have a frequency interval equal to an even-numbered multiple of a symbol rate of the transmitted digital information data sequences. Also, the carrier frequencies used in the at least one communication station in the second area have a frequency interval equal to an even-numbered multiple of a symbol rate of the transmitted digital information data sequences, and have a frequency difference equal to an odd-numbered multiple of a symbol rate of the transmitted digital information data sequences with respect to the carrier frequencies used in the at least one communication station in the first area, respectively.

Since the carrier frequencies used in the communication station in the first and second areas have a frequency interval equal to an even-numbered multiple of a symbol rate of the transmitted digital information data sequences, respectively and also carrier frequencies with a difference equal to an odd-numbered multiple of a symbol rate of the transmitted digital information data sequences are used between the adjacent first and second areas, deterioration of transmission quality due to possible offset of chip timings of DS-spread spectrum signals from the communication stations can be prevented, without inviting any interference problem between the adjacent first and second areas.

It is preferred that the PN code sequence is Barker sequence (1,1,1,0,0,0,1,0,0,1,0) with sequence length of 11, or Lugandre sequence (1,1,0,1,1,1,0,0,0,1,0) with sequence length of 11. These PN code sequences are very effective for reducing influence of possible chip timing errors between the communication channels.

Further objects and advantages of the present invention will be apparent from the following description of the preferred embodiments of the invention as illustrated in the accompanying drawings.

DESCRIPTION OF THE PREFERRED EMBODIMENTS

Figure 1:
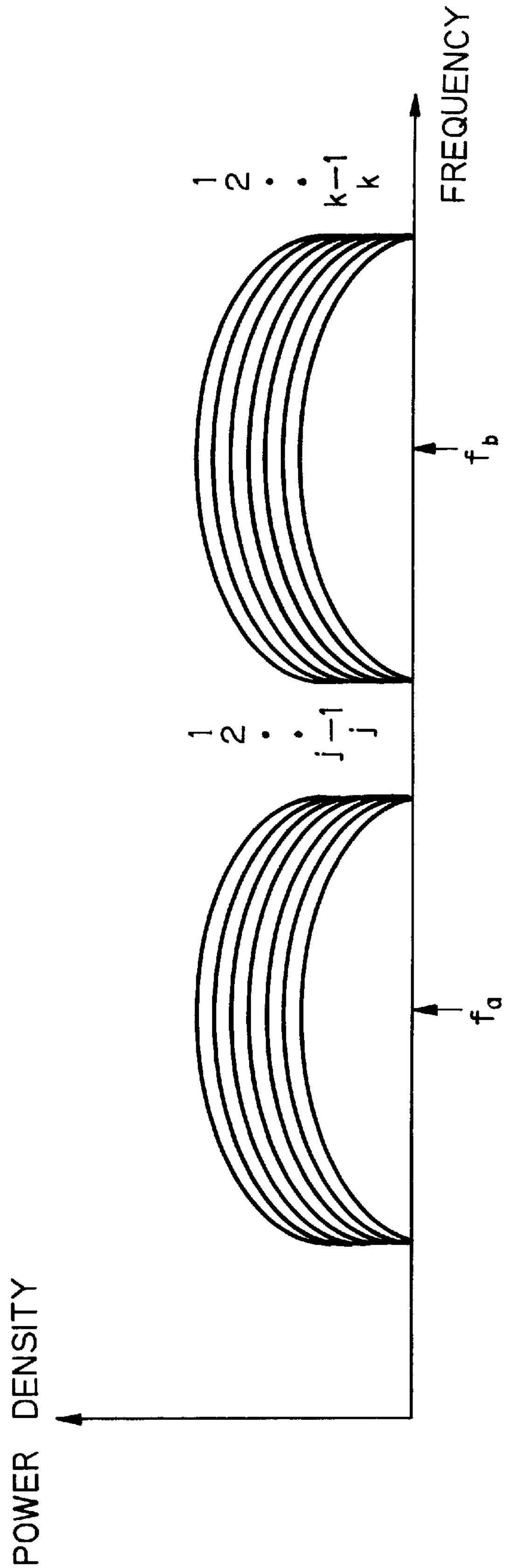
FIG. 1 shows spread spectrum signals according to the conventional spread spectrum communications system.
Figure 2:
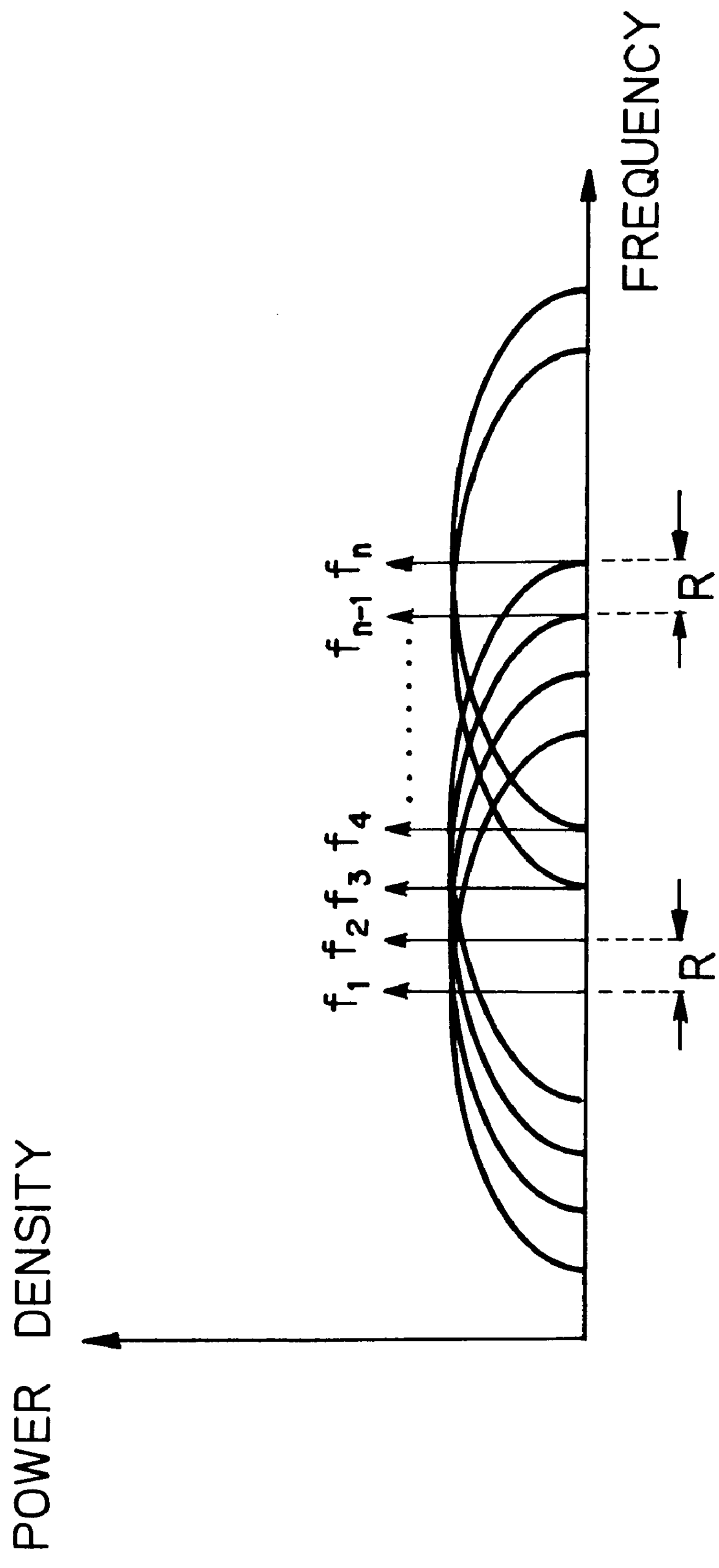
FIG. 2 shows spread spectrum signals according to the conventional CFO-SSMA communication system.
Figures 3, 3A, 3B:
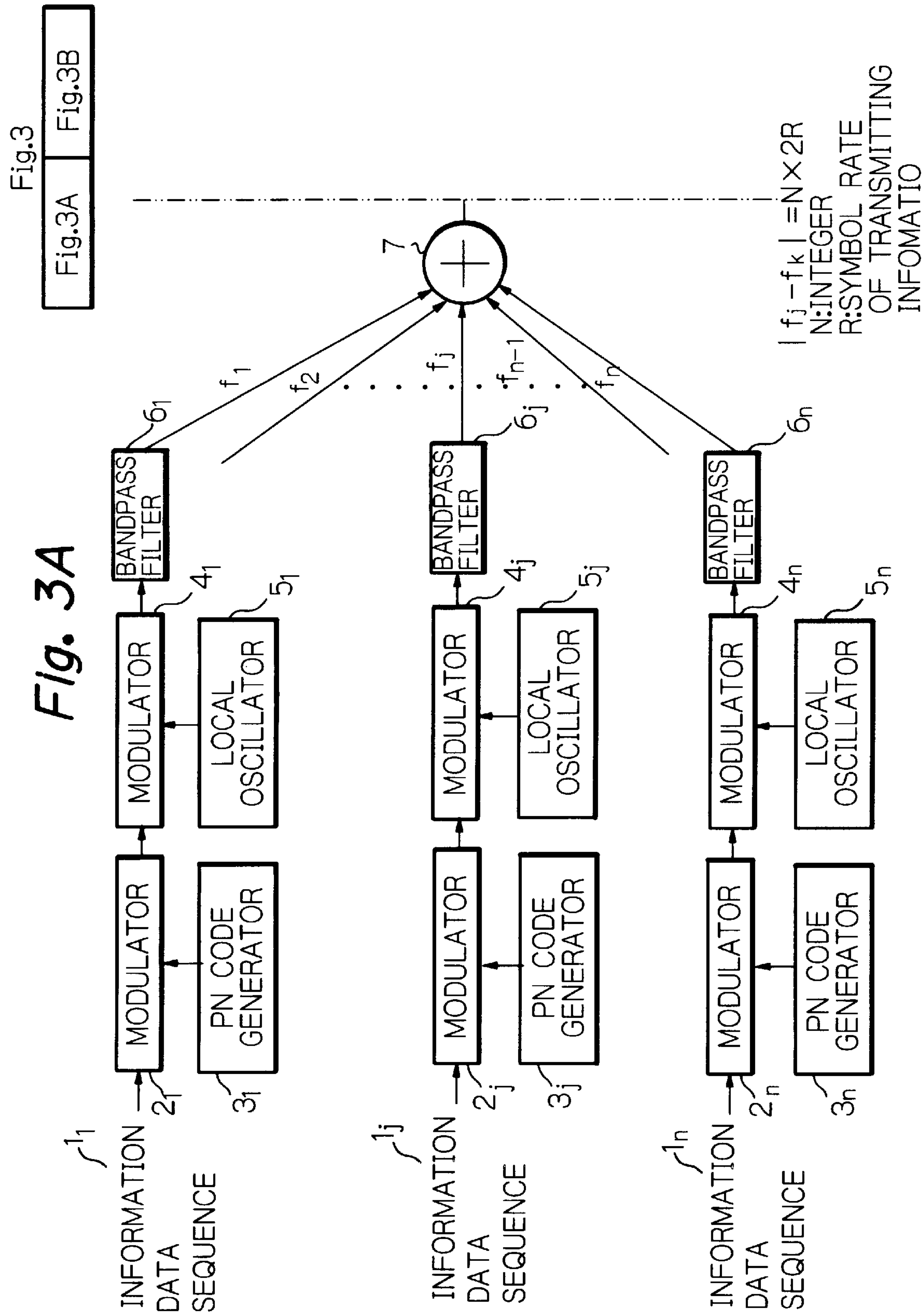
FIG. 3 constituted from FIGS. 3A and 3B schematically shows a preferred embodiment of a spread spectrum communications system according to the present invention.
Figure 3B:
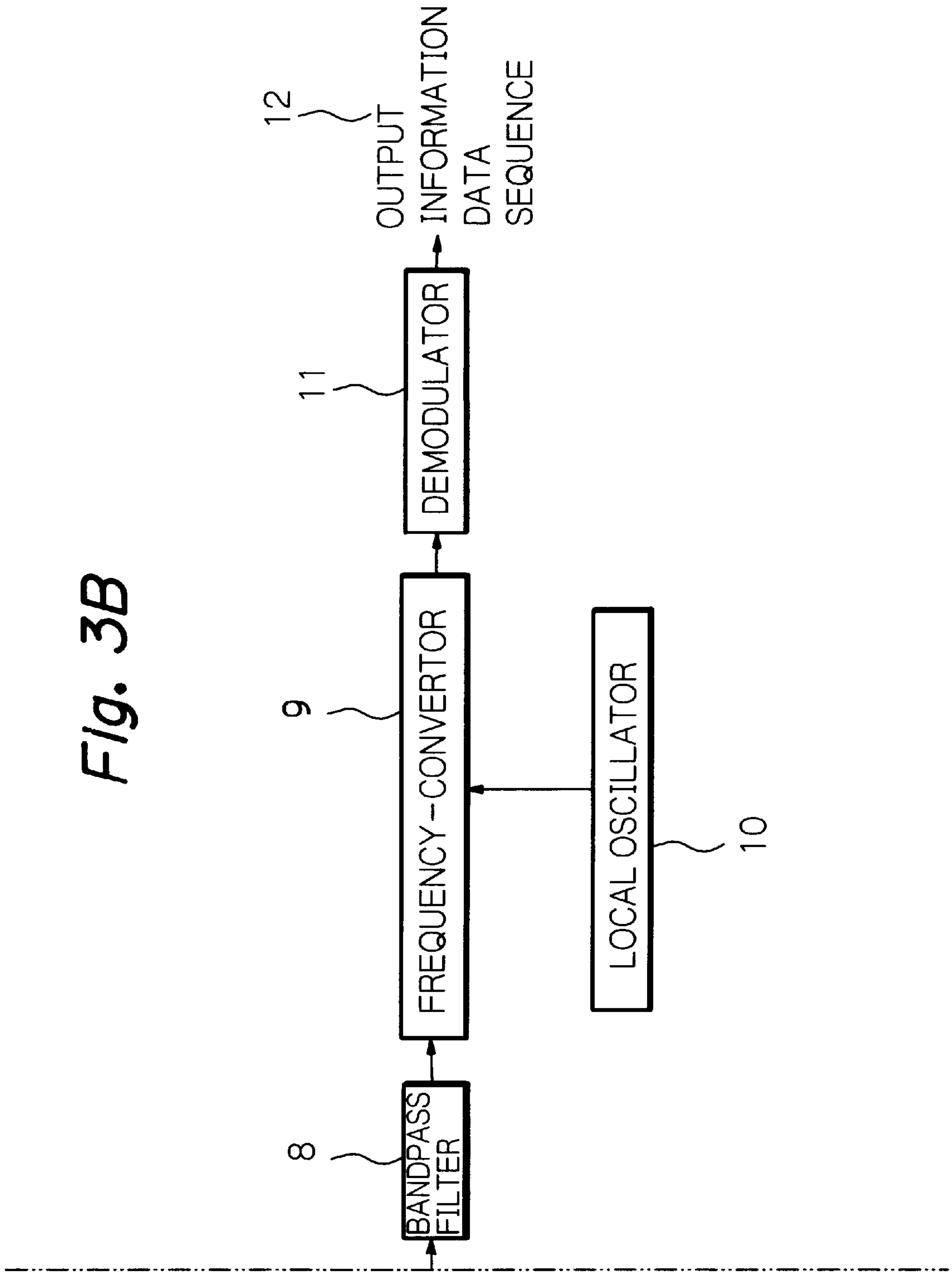

In FIG. 3 which schematically shows a DS-SS communication system having simultaneous transmitting stations as a preferred embodiment according to the present invention, reference numerals $\mathbf{1}_1$ to $\mathbf{1}_n$ denote binary coded information data signals in the respective simultaneous transmitting stations. PN code generators $\mathbf{3}_1$ to $\mathbf{3}_n$ generate Barker sequence (1,1,1,0,0,0,1,0,0,1,0) used as PN code sequences for spreading spectrum of the information data. The PN code sequence from the generators $\mathbf{3}_1$ to $\mathbf{3}_n$ are provided to first modulators $\mathbf{2}_1$ to $\mathbf{2}_n$ of the respective transmitting stations, respectively. The first modulators $\mathbf{2}_1$ to $\mathbf{2}_n$ binary multiply the information data $\mathbf{1}_1$ to $\mathbf{1}_n$ applied thereto with the same PN code sequence $PN_1$ fed from the PN code generators $\mathbf{3}_1$ to $\mathbf{3}_n$ to produce baseband signals, respectively.

The first modulators $\mathbf{2}_1$ to $\mathbf{2}_n$ are further connected to second modulators $\mathbf{4}_1$ to $\mathbf{4}_n$ of the respective transmitting stations. These second modulators $\mathbf{4}_1$ to $\mathbf{4}_n$ are phase modulators following local oscillators $\mathbf{5}_1$ to $\mathbf{5}_n$, respectively. The modulators $\mathbf{4}_1$ to $\mathbf{4}_n$ modulate the baseband signals from the first modulators $\mathbf{2}_1$ to $\mathbf{2}_n$ by carriers fed from the respective local oscillators $\mathbf{5}_1$ to $\mathbf{5}_n$, respectively. The frequencies of the carriers fed from the local oscillators $\mathbf{5}_1$ to $\mathbf{5}_n$ and applied to the modulators $\mathbf{4}_1$ to $\mathbf{4}_n$ are different from each other as shown by $f_1$ to $f_n$ in FIG. 3. It is important that, according to the present invention, the interval of the carrier frequencies $f_1$ to $f_n$ is determined to an integral multiple of double of (an even-numbered multiple of) a symbol rate of the transmitting information data, as will be mentioned later.

In respective transmitting stations, band pass filters $\mathbf{6}_1$ to $\mathbf{6}_n$ are connected to the second modulators $\mathbf{4}_1$ to $\mathbf{4}_n$, for extracting frequency component to be transmitted from the modulated signals. In this embodiment, all the transmitting stations transmitting data at the same information bit rate and the same spectrum spreading code chip rate.

It should be noted that the spread spectrum communications systems is applicable in both wire and radio communication systems. Reference numeral 7 in FIG. 3 represents that the signals transmitted from the respective transmitting stations are multiplexed during propagation through transmission medium such as wired or radio communication medium.

In a receiving station, a band pass filter 8 for extracting frequency component necessary for demodulating is connected to a frequency-convector 9. The frequency-converter 9 is connected to a local oscillator 10, whose frequency is determined in accordance with the carrier frequency of the desired signal, and to a demodulator 11 constituted by a correlator for supplying recovered information data 12.

As for the correlator 11, convolution integrator and matched filter both typically realized with a SAW device in the intermediate frequency level, and those realized with s digital logic LSI and a Charge Coupled Device (CCD) in the baseband level are well known.

Hereinafter, the operation of the DS-SS communication system of this embodiment will be described in detail.

In the first transmitting station, the information data $\mathbf{1}_1$ is binary multiplied with the Barker sequence (1,1,1,0,0,0,1,0,0,1,0) $PN_1$, which is one of the PN code sequences at the first modulator $\mathbf{2}_1$, then at the output of the second modulator $\mathbf{4}_1$ the modulated signal with the carrier frequency $f_1$ assigned to this transmitting station is obtained. The modulated signal is transmitted to receiving stations after passing the band pass filter $\mathbf{6}_1$. Similar to this, in the jth station, the information data $\mathbf{1}_j$ is binary multiplied with the Barker sequence (1,1,1,0,0,0,1,0,0,1,0) $PN_1$ which is one of the PN code sequence at the first modulator $\mathbf{2}_j$, then at the second modulator $\mathbf{4}_j$, the modulated signal with the carrier frequency $f_j$ assigned to this jth transmitting station is obtained. The modulated signal is transmitted after passing the band pass filter $\mathbf{6}_j$.

Figure 4:
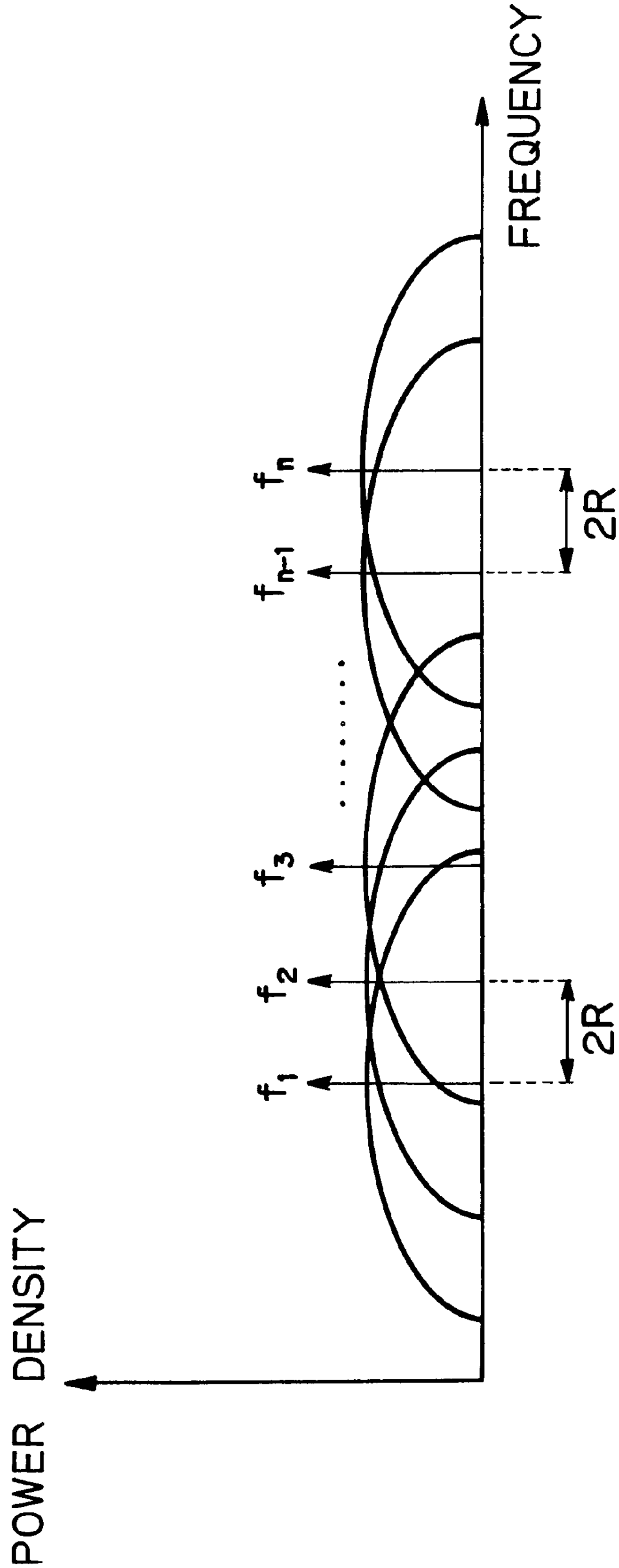
FIG. 4 shows spread spectrum signals in the embodiment shown in FIG. 3.

The modulated signals transmitted from the respective transmitting stations 1 to n will have therefore different carrier frequencies $f_1$ to $f_n$, respectively, and are multiplexed together during propagation. Thus, received signals at the receiving side will have signal spectrums as shown FIG. 4. Since the difference between the carrier frequencies $f_1$ to $f_n$ is extremely small in comparison with each spectrum bandwidth of the modulated signal, the most part of the spectrums of the adjacent signals overlap each other.

According to the conventional CFO-SSMA communication system (Sumiya et al. U.S. Pat. No. 5,319,672), the interval of frequencies of the carriers in the respective transmitting stations $f_1$ to $f_n$ is determined to an integral multiple of a symbol rate (frequency) of the transmitting information, whereas according to the present invention, the interval of frequencies of the carriers in the respective transmitting stations $f_1$ to $f_n$ is determined to an integral multiple of double of (an even-numbered multiple of) a symbol rate (frequency) of the transmitting information. Namely, $|f_j-f_k|=N\times R$, where N is an integer and R is a symbol rate (frequency) of the transmitting information, as shown in FIG. 3. Thus determined carrier frequencies of the communication channels used in the respective communication stations will result to prevent possible quality deterioration in transmission due to chip timing errors between the communication stations.

In the above-mentioned embodiment, Lugandre sequence (1,1,0,1,1,1,0,0,0,1,0) can be used instead of the Barker sequence (1,1,1,0,0,0,1,0,0,1,0).

Figure 5:
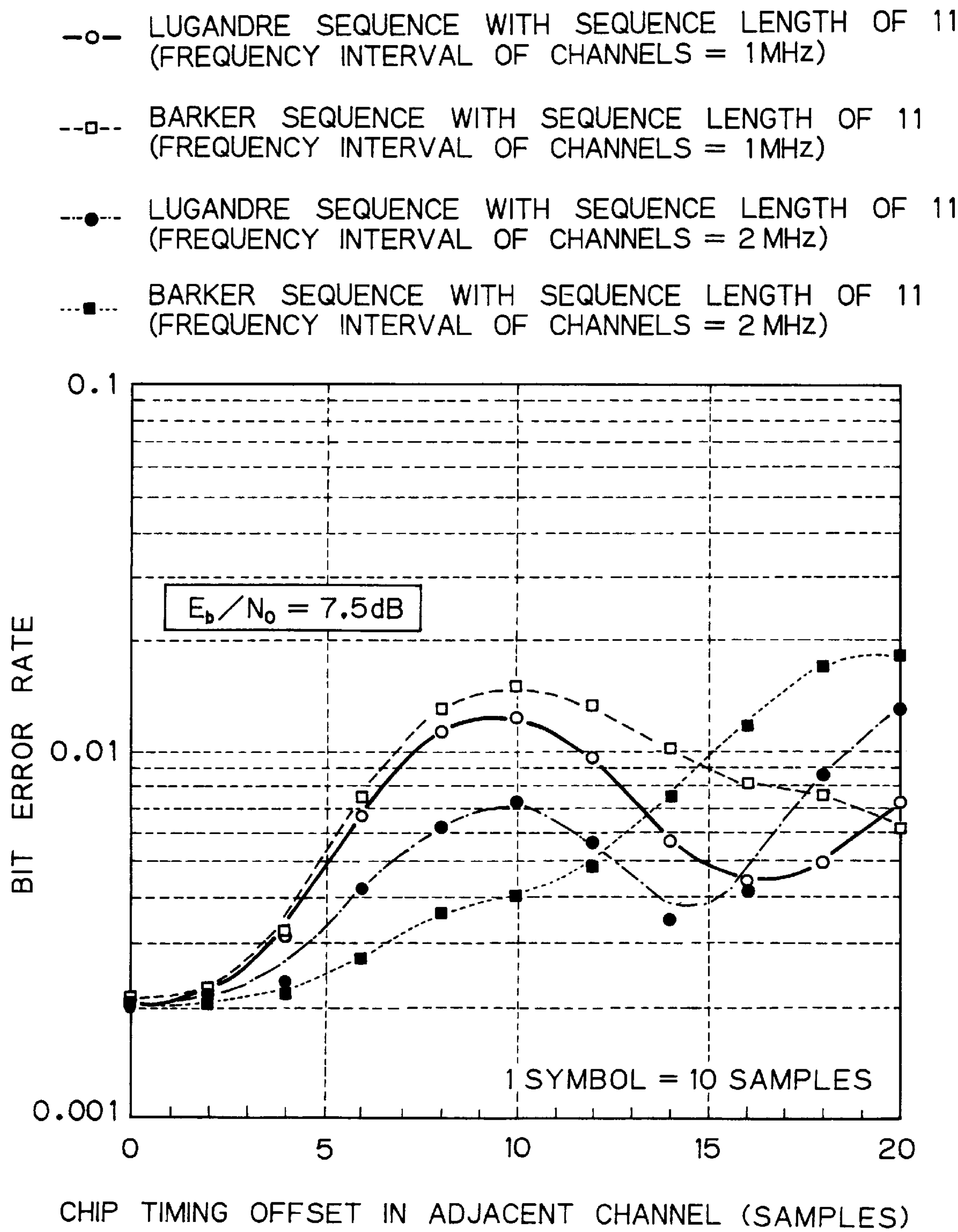
FIG. 5 illustrates bit error rate characteristics with respect to delay in an adjacent channel in the spread spectrum communications system according to the invention and the conventional CFO-SSMA communication system.

FIG. 5 illustrates bit error rate characteristics in the spread spectrum communications system according to the invention and the conventional CFO-SSMA communication system. Those bit error rate characteristics are obtained by a computer simulation with a certain condition where adjacent channel(s) exists on one side or on both sides of a desired channel, the symbol rate of the transmitting information R is 1 Mbit/s, the modulation/demodulation method is SS/BPSK/differential detection method, the number of simultaneous transmission channels is 3 channels (the number of interfering waves is two, and the number of samples par one chip is 10. In the figure, the horizontal axis represents a chip timing offset in adjacent channel with respect to a desired channel (the maximum is two chips, 20 samples), and the vertical axis represents a bit error rate in the desired channel.

As will be understood from this figure, the spread spectrum communications system according to the present invention, which system has a twice frequency interval as much as the symbol rate of transmitting information R (frequency interval of channels=2 MHz) indicates lower bit-error rate than the conventional CFO-SSMA communication system which has a frequency interval equal to the symbol rate of transmitting information R (frequency interval of channels=1 MHz), within a region where the chip timing offset is equal to or lower than 1.5 chip (15 samples). Thus, according to the present invention, certain extent error in chip timing synchronization which is impossible to physically adjust can be tolerated. In other words, the present invention can provide communication links with better quality under the same error amount of the chip timing control (error of equal to or less than 1.5 chip).

Figure 6A:
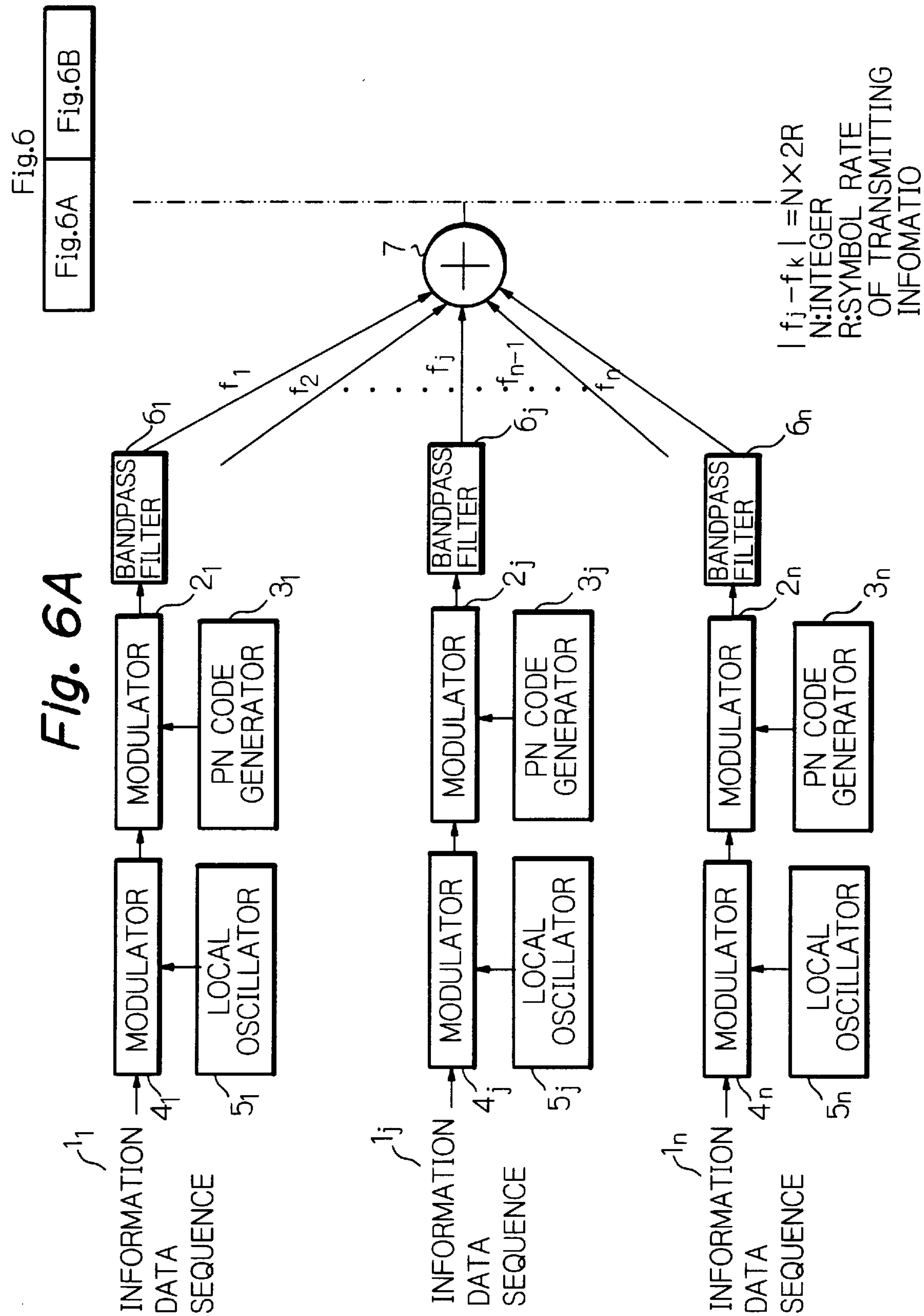
FIG. 6 constituted from FIGS. 6A and 6B schematically shows another embodiment of a spread spectrum communications system according to the present invention.
Figure 6B:
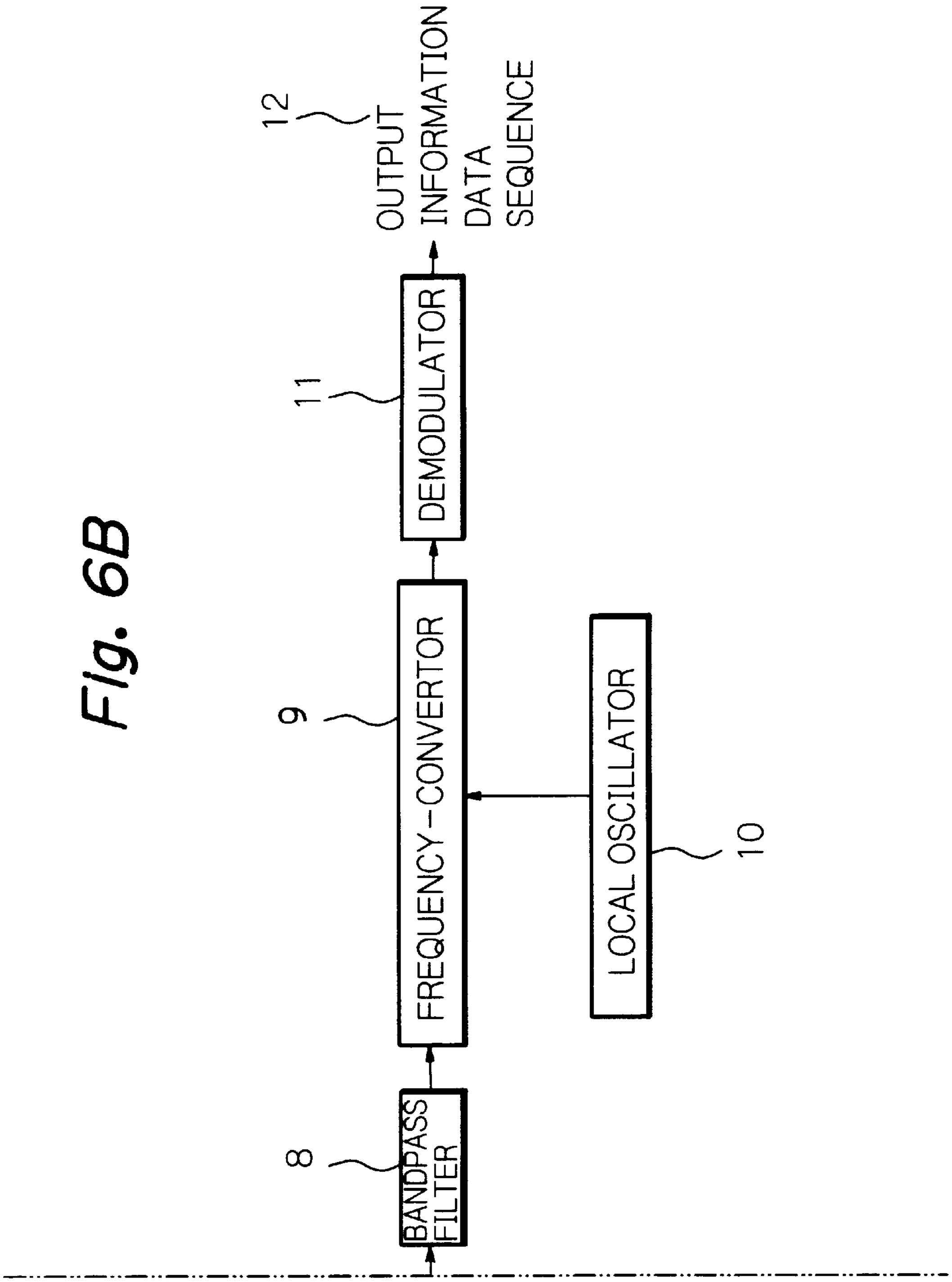

FIG. 6 schematically shows a DS-SS communication system having n simultaneous transmitting stations as another embodiment according to the present invention.

The construction and operations of this embodiment are the same as these of the embodiment shown in FIG. 3, except that, in the respective transmitting stations, modulators $\mathbf{2}_1$, to $\mathbf{2}_n$ and PN code generators $\mathbf{3}_1$ to $\mathbf{3}_n$ are located downstream of modulators $\mathbf{4}_1$ to $\mathbf{4}_n$ and local oscillators $\mathbf{5}_1$ to $\mathbf{5}_n$, respectively. The advantages induced from this embodiment is also similar to that of the embodiment of FIG. 3.

Figure 7:
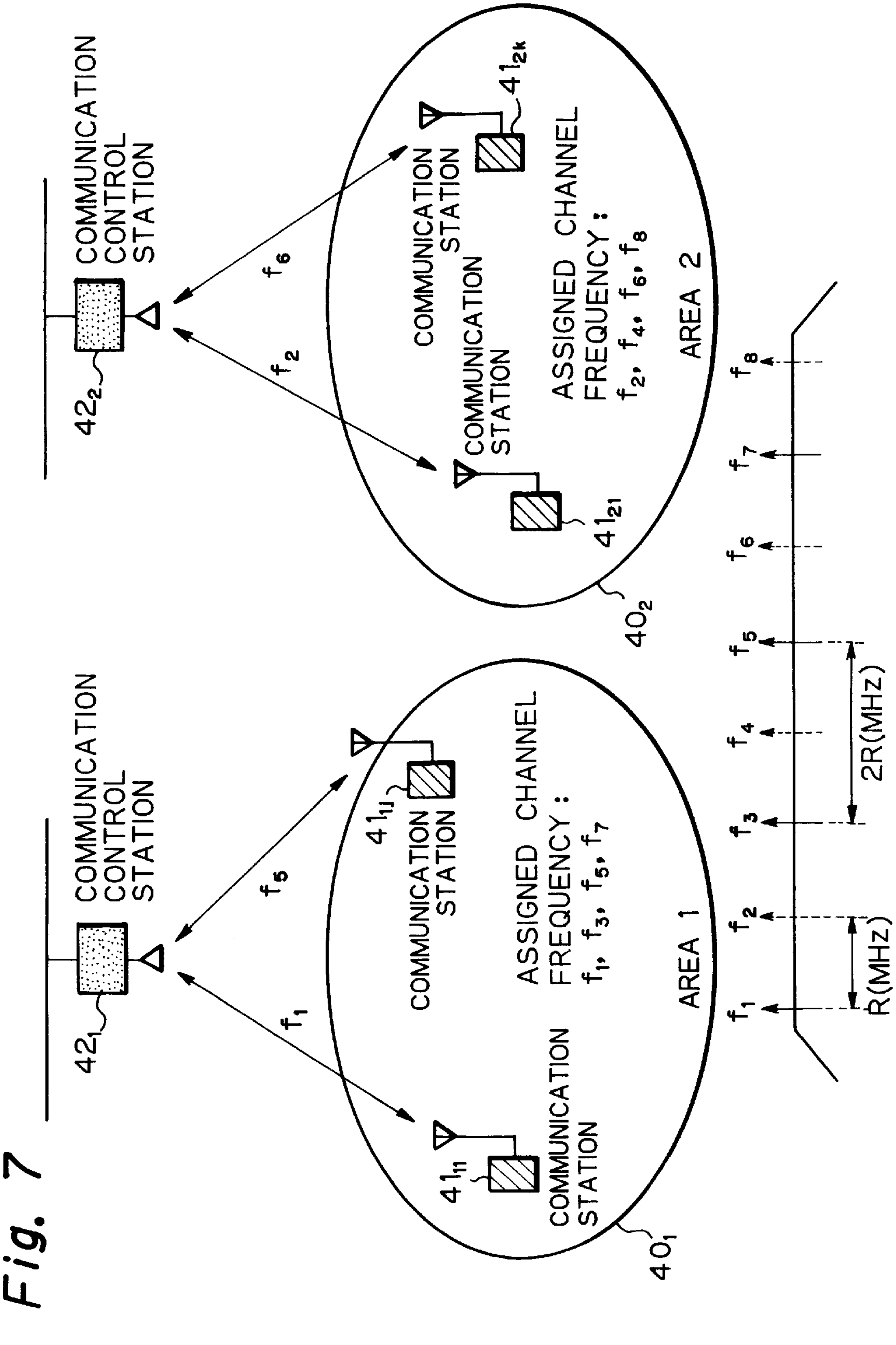
FIG. 7 shows a further embodiment of a spread spectrum communications system according to the present invention applied to a plurality of adjacent areas.

FIG. 7 shows a further embodiment of a spread spectrum communications system according to the present invention. In this embodiment, the approach wherein the interval of frequencies of the carriers in the stations is determined to an even-numbered multiple of a symbol rate (frequency) of the transmitting information is simultaneously achieved in different areas adjacent to each other. Namely, in both two areas $\mathbf{40}_1$ and $\mathbf{40}_2$ which are adjacent to each other, the Barker sequence (1,1,1,0,0,0,1,0,0,1,0) with sequence length of 11 or the Lugandre sequence (1,1,0,1,1,1,0,0,0,1,0) with sequence length of 11 is used for the spread spectrum sequence and carriers are assigned to communication stations in both the areas so that the interval of the carrier frequencies in communication stations in the same area is determined to an even-numbered multiple of a symbol rate (frequency) of the transmitting information.

As shown in FIG. 7, one of channel frequencies $f_1$, $f_3$ $f_5$ and $f_7$ is assigned to each of communication stations $\mathbf{41}_{11}$ to $\mathbf{41}_{1j}$ (which produce information data corresponding to the information data $\mathbf{10}_1$ to $\mathbf{10}_j$) in the area 1 ($\mathbf{40}_1$), and one of channel frequencies $f_2$, $f_4$ $f_6$ and $f_8$ is assigned to each of communication stations $\mathbf{41}_{21}$ to $\mathbf{41}_{2k}$ (which produce information data corresponding to the information data $\mathbf{10}_1$ to $\mathbf{10}_k$) in the area 2 ($\mathbf{40}_2$). The communication stations in the areas $\mathbf{40}_1$ and $\mathbf{40}_2$ can communicate with a main network via respective communication control stations $\mathbf{42}_1$ and $\mathbf{42}_2$ which cover these areas $\mathbf{40}_1$ and $\mathbf{40}_2$ as for communication service areas, respectively.

The carrier frequencies $f_1$ to $f_n$ of the communication channels have an interval which is equal to an integral multiple of a symbol rate (frequency) of the transmitting information, and have ascstationing frequency order from $f_1$ to $f_n$. Thus, a group of channel frequencies $f_1$, $f_3$ $f_5$ and $f_7$ assigned to each of communication stations $\mathbf{41}_{11}$ to $\mathbf{41}_{1j}$ in the area 1 have an interval which is equal to an even-numbered multiple of a symbol rate (frequency) of the transmitting information, as well as a group of channel frequencies $f_2$, $f_4$ $f_6$ and $f_8$ assigned to each of communication stations $\mathbf{41}_{21}$ to $\mathbf{41}_{2k}$ in the area 2 have an interval which is equal to an even-numbered multiple of a symbol rate (frequency) of the transmitting information. Frequency difference of the carrier frequencies used in the different two areas 1 and 2 is equal to an odd-numbered multiple of a symbol rate of the transmitted digital information data sequences. In addition, different channel frequencies $f_1$ to $f_n$ are used within the adjacent areas 1 and 2. As a result, deterioration of transmission quality due to possible offset of chip timings of DS-spread spectrum signals from the transmitting stations can be prevented, without inviting any interference problem between the adjacent areas 1 and 2.

In the aforementioned embodiment, there are two adjacent areas and eight communication channels. However, the present invention can be applied to systems having any number of adjacent areas and any number of communication channels.

Many widely different embodiments of the present invention may be constructed without departing from the spirit and scope of the present invention. It should be understood that the present invention is not limited to the specific embodiments described in the specification, except as defined in the appended claims.

What is claimed is:

1. A spread spectrum communications system comprising, at least one communication station for transmitting a plurality of digital information data sequences via a plurality of communication channels by using the same PN code sequence, said at least one communication station spectrum spreading the respective digital information data sequences by said PN code sequence to provide spread spectrum signals, modulating said spread spectrum signals by respective carriers having different frequencies from each other to provide modulated signals, and then transmitting said modulated signals via said communication channels respectively, wherein a frequency interval of said carrier frequencies of the channels is determined to an even-numbered multiple of a symbol rate of said transmitted digital information data sequences.

2. A system as claimed in claim 1, wherein said PN code sequence is Barker sequence (1,1,1,0,0,0,1,0,0,1,0) with sequence length of 11.

3. A system as claimed in claim 1, wherein said PN code sequence is Lugandre sequence (1,1,0,1,1,1,0,0,0,1,0) with sequence length of 11.

4. A spread spectrum communications system comprising:

a plurality of transmitting stations; and at least one receiving station;

each of said transmitting stations spectrum spreading a digital information data sequence by a PN code sequence to provide a baseband spread spectrum signal, modulating said baseband spread spectrum signal by a carrier to provide a modulated signal, and then transmitting said modulated signal to said receiving station, said receiving station receiving signals transmitted from said transmitting stations to provide a received signal, extracting a signal having a center frequency which corresponds to the carrier frequency of the desired channel, and demodulating to detect the digital information data sequence transmitted from the desired transmitting station, by using said PN code sequence, wherein said transmitting stations use the same PN code sequence commonly assigned to all users for spectrum spreading the respective digital information data sequence and use carriers having different frequencies from each other, and wherein a frequency interval of said carrier frequencies is determined to an even-numbered multiple of a symbol rate of said transmitted digital information data sequence.

5. A spread spectrum communications system comprising, at least one communication station for transmitting a plurality of digital information data sequences via a plurality of communication channels by using the same PN code sequence, said at least one communication station modulating the respective digital information data sequences respective by carriers having different frequencies from each other to provide modulated signals, spectrum spreading said modulated signal by said PN code sequence to provide spread spectrum signals, and then transmitting said spread spectrum signals via said communication channels respectively, wherein a frequency interval of said carrier frequencies is determined to an even-numbered multiple of a symbol rate of said transmitted digital information data sequences.

6. A system as claimed in claim 5, wherein said PN code sequence is Barker sequence (1,1,1,0,0,0,1,0,0,1,0) with sequence length of 11.

7. A system as claimed in claim 5, wherein said PN code sequence is Lugandre sequence (1,1,0,1,1,1,0,0,0,1,0) with sequence length of 11.

8. A spread spectrum communications system comprising:

a plurality of transmitting stations; and at least one receiving station;

each of said transmitting stations modulating a digital information data sequence by a carrier to provide a modulated signal, spectrum spreading said modulated signal by a PN code sequence to provide a spread spectrum signal, and then transmitting said spread spectrum signal to said receiving station, said receiving station receiving signals transmitted from said transmitting stations to provide a received signal, extracting a signal having a center frequency which corresponds to the carrier frequency of the desired channel, and demodulating to detect the digital information data sequence transmitted from the desired transmitting station, by using said PN code sequence, wherein said transmitting stations use the same PN code sequence commonly assigned to all users for spectrum spreading the respective digital information data sequence and use carriers having different frequencies from each other, and wherein a frequency interval of said carrier frequencies is determined to an even-numbered multiple of a symbol rate of said transmitted digital information data sequence.

9. A spread spectrum communications system comprising:

at least one communication station in a first area for transmitting a plurality of digital information data sequences via a plurality of communication channels by using the same PN code sequence; and at least one communication station in a second area adjacent to said first area for transmitting a plurality of digital information data sequences via a plurality of communication channels by using the same PN code sequence, said communication stations spectrum spreading the respective digital information data sequences by said PN code sequence to provide spread spectrum signals, modulating said spread spectrum signals by respective carriers having different frequencies from each other to provide modulated signals, and then transmitting said modulated signals via said communication channels respectively, wherein said carrier frequencies used in the at least one communication station in said first area have a frequency interval equal to an even-numbered multiple of a symbol rate of said transmitted digital information data sequences, and wherein said carrier frequencies used in the at least one communication station in said second area have a frequency interval equal to an even-numbered multiple of a symbol rate of said transmitted digital information data sequences, and have a frequency difference equal to an odd-numbered multiple of a symbol rate of said transmitted digital information data sequences with respect to said carrier frequencies used in the at least one communication station in said first area, respectively.

10. A system as claimed in claim 9, wherein said PN code sequence is Barker sequence (1,1,1,0,0,0,1,0,0,1,0) with sequence length of 11.

11. A system as claimed in claim 9, wherein said PN code sequence is Lugandre sequence (1,1,0,1,1,1,0,0,0,1,0) with sequence length of 11.

12. A spread spectrum communications system comprising:

at least one communication station in a first area for transmitting a plurality of digital information data sequences via a plurality of communication channels by using the same PN code sequence; and at least one communication station in a second area adjacent to said first area for transmitting a plurality of digital information data sequences via a plurality of communication channels by using the same PN code sequence, said communication stations modulating the respective digital information data sequences by respective carriers having different frequencies from each other to provide modulated signals, spectrum spreading said modulated signals by said PN code sequence to provide spread spectrum signals, and then transmitting said spread spectrum signals via said communication channels respectively, wherein said carrier frequencies used in the at least one communication station in said first area have a frequency interval equal to an even-numbered multiple of a symbol rate of said transmitted digital information data sequences, and wherein said carrier frequencies used in the at least one communication station in said second area have a frequency interval equal to an even-numbered multiple of a symbol rate of said transmitted digital information data sequences, and have a frequency difference equal to an odd-numbered multiple of a symbol rate of said transmitted digital information data sequences with respect to said carrier frequencies used in the at least one communication station in said first area, respectively.

13. A system as claimed in claim 12, wherein said PN code sequence is Barker sequence (1,1,1,0,0,0,1,0,0,1,0) with sequence length of 11.

14. A system as claimed in claim 12, wherein said PN code sequence is Lugandre sequence (1,1,0,1,1,1,0,0,0,1,0) with sequence length of 11.

* * * * *